US010668489B2

(12) United States Patent
Sanwald

(10) Patent No.: US 10,668,489 B2
(45) Date of Patent: Jun. 2, 2020

(54) MODULAR NOZZLE HAVING A WEAR-RESISTANT HOUSING PART

(71) Applicant: GEMA SWITZERLAND GMBH, St. Gallen (CH)

(72) Inventor: Marco Sanwald, Abtwil (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 103 days.

(21) Appl. No.: 15/021,612

(22) PCT Filed: Aug. 19, 2014

(86) PCT No.: PCT/EP2014/067653
§ 371 (c)(1),
(2) Date: Mar. 11, 2016

(87) PCT Pub. No.: WO2015/043836
PCT Pub. Date: Apr. 2, 2015

(65) Prior Publication Data

US 2016/0228884 A1 Aug. 11, 2016

(30) Foreign Application Priority Data

Sep. 30, 2013 (DE) ........................ 10 2013 219 813

(51) Int. Cl.
*B05B 1/04* (2006.01)
*B05B 15/18* (2018.01)
(Continued)

(52) U.S. Cl.
CPC ................ *B05B 1/044* (2013.01); *B05B 1/00* (2013.01); *B05B 7/1486* (2013.01); *B05B 15/18* (2018.02); *B05B 7/14* (2013.01)

(58) Field of Classification Search
CPC .. B05B 1/00; B05B 1/044; B05B 7/14; B05B 7/1486; B05B 7/0815; B05B 7/0846; B05B 1/042; B05B 1/04
(Continued)

(56) References Cited

U.S. PATENT DOCUMENTS 3,291,631 A 12/1966 Smith
5,241,938 A * 9/1993 Takagi ............... F02M 51/0675 123/472
(Continued)

FOREIGN PATENT DOCUMENTS

CN 1635932 A 7/2005
DE 1967693 U 8/1967
(Continued)

OTHER PUBLICATIONS

First Chinese Office Action, for Chinese Patent Application No. 201480053724.0, dated Apr. 14, 2017, 9 pages.
(Continued)

*Primary Examiner* — Alex M Valvis
(74) *Attorney, Agent, or Firm* — Kinney & Lange, P.A.

(57) ABSTRACT

A nozzle for atomizing coating materials, in particular coating powder, includes a housing, which has an inlet-side opening and an outlet-side opening, and the openings are connected to each other by a passage channel. The housing has an inner housing part, which defines the passage channel, and an outer housing part, which is designed to detachably connect the nozzle to a coating device. In order to optimize the production process for the nozzle and to reduce costs, the inner housing part and the outer housing part are designed as separate individual pieces.

8 Claims, 7 Drawing Sheets

(51) Int. Cl.
*B05B 7/14* (2006.01)
*B05B 1/00* (2006.01)

(58) Field of Classification Search
USPC .................. 239/600, 589, 590, 590.3, 590.5, 239/591–595, 597, 599, DIG. 14, DIG. 19
See application file for complete search history.

(56) References Cited

U.S. PATENT DOCUMENTS

| | | | | |
|---|---|---|---|---|
| 5,478,014 | A * | 12/1995 | Hynds | B05B 1/28 239/135 |
| 7,823,800 | B1 * | 11/2010 | Kalpakoff | A01G 25/06 239/1 |
| 8,622,322 | B2 * | 1/2014 | Yeager | B05B 1/3436 239/416.4 |
| 2001/0042508 | A1 | 11/2001 | Kay et al. | |
| 2003/0038193 | A1 * | 2/2003 | Rehman | B05B 1/265 239/704 |
| 2007/0216158 | A1 * | 9/2007 | Kertesz | F16L 33/22 285/256 |
| 2011/0079661 | A1 | 4/2011 | Barton | |

FOREIGN PATENT DOCUMENTS

| | | | |
|---|---|---|---|
| DE | 69611547 | T2 | 8/2001 |
| DE | 10155633 | A1 | 5/2003 |
| WO | 03004169 | A2 | 1/2003 |

OTHER PUBLICATIONS

English translation of International Search Report dated Oct. 22, 2014, for corresponding PCT Application No. PCT/EP2014/067653.
German Office Action dated May 30, 2014, for corresponding German Application No. 102013219813.2.
English translation of the International Preliminary Report on Patentability dated Mar. 31, 2016, for corresponding PCT Application No. PCT/EP2014/067653.

* cited by examiner

MODULAR NOZZLE HAVING A WEAR-RESISTANT HOUSING PART

BACKGROUND

The present invention relates to a nozzle for spraying coating material, particularly coating powder.

Accordingly, the present invention relates in particular to a nozzle having a housing comprising a first inlet-side opening and second outlet-side opening connected together by a through-channel. The housing comprises an inner housing part which defines the through-channel and an outer housing part which is designed to detachably connect the nozzle to a coating mechanism.

A plurality of various nozzles for spraying coating material is known from the prior art. An appropriate nozzle can precisely adapt the spray pattern of a coating mechanism to the product to be coated. This is particularly of advantage for the reason that optimum coating quality, consistency and operating efficiency can be obtained by the appropriate selection of a nozzle. A suitable nozzle will thus achieve the desired coating faster and more easily without wasting coating material in the process. In other words, the known nozzles serve in the spraying of the coating material and thus the formation of a homogeneous coating material cloud.

In order to be able to optimally coat different coating objects, for example flat surfaces, engraved plates or products of complex geometry, different forms of nozzles are known from the prior art. Thus, depending on the object to be coated, deflector cone nozzles, flat spray nozzles, finger nozzles or rotary atomizers can for example be used.

Depending on the respective type of nozzle, same can at times have very complex geometries. In manufacturing the known nozzles, it is known for these to either be machined by turning or produced as a plastic injection component. The manufacture is however often coupled with great complexity, which leads to high manufacturing costs. This is particularly uneconomical with lower quantities.

For the reasons given above, the present invention is based on the task of specifying a nozzle for spraying coating material which exhibits a particularly simple geometry and can be produced at low manufacturing expenditure.

SUMMARY

A nozzle for spraying coating material is particularly characterized by the nozzle housing having an inner housing part and an outer housing part which are formed as separate individual component parts.

The advantages of the nozzle for spraying coating material disclosed herein include the following: Forming the housing from at least two component parts can thus achieve the particularly quick and simple manufacture of the individual parts. This reduces manufacturing costs compared to the single-piece nozzles known in the prior art. The modular structure of the inventive nozzle from individual component parts also ensures that it is not always necessary for the entire housing of the nozzle to have to be replaced during servicing. Instead, only the affected part of the nozzle can be replaced, for example the inner housing part through which coating material flows.

One possible realization of the nozzle disclosed herein thus provides for the inner housing part to be formed from a different material than the outer housing part. The nozzles for spraying coating material known from the prior art are basically formed from one material. In the process, however, the known nozzles frequently consist of a relatively expensive material so that particularly the through-channel will have lasting durability so as to result in an optimum surface for conveying the coating material. By contrast, the embodiment at issue here is based on the recognition that only the surfaces of the inventive nozzle which come into contact with the coating material need to be produced from high-grade materials. For this reason it is particularly advantageous for the inner housing part, which defines the through-channel, to consist of a high-grade material and/or material having a high-grade surface while the outer housing part, which serves to connect the nozzle to the coating mechanism, can be formed from more economical materials. Doing so thus allows a further optimizing of the production costs for the inventive nozzle without being forced to suffer any reduction in coating quality.

Specifically, it can thereby be provided for the inner housing part to be formed from polytetrafluoroethylene (PTFE). The particularly inert and long-lasting PTFE material is particularly well suited as the material for the inner housing part; i.e. for forming the through-channel. This is conducive particularly in tribo-coating devices which are based on frictionally charging the coating material. The pulverized coating material is thereby positively charged on the interior through-channel wall in the inner PTFE housing part by friction. PTFE thereby guarantees optimum charging and has very good non-stick properties to prevent coating material residues.

On the other hand, any material of lower material cost can be used as the material for the outer housing part. It is thereby in principle conceivable for the outer housing part to be formed from metal or plastic. However, using semi-crystalline thermoplastics such as polypropylene (PP), for example, is particularly preferential. This is of particular advantage because PP is particularly well-suited to injection molding and can thus be very easily adapted to the structure of the inner housing part.

In accordance with a further aspect of the nozzle disclosed herein, the inner housing part is particularly detachably connected to the outer housing part. The particularly wear-prone inner housing part of the inventive nozzle can accordingly be readily replaced for maintenance purposes while the outer housing part can usually still be used further. With the nozzles known from the prior art, it has been in contrast always necessary to replace the entire nozzle. There is not just the corresponding cost advantage with the inventive nozzle but also a positive effect on the environment.

The detachable connection of the two housing parts can thereby be realized for example by means of an engaging mechanism which activates as soon as the inner housing part is slid into the outer housing part. Specifically, the outer housing part can comprise to this end an interior projection having a shoulder. According to this embodiment, the shoulder is formed to positively engage in an exterior groove of the inner housing part. For example, the inner housing part can be slid into the outer housing part until its exterior groove comes to rest on the shoulder of the outer housing part and positively connect with the latter. The shoulder is thereby preferably oriented opposite the direction of coating material flow. This thus in particular prevents the inner housing part from being able to slide out of the outer housing part in response to coating material pressure.

In accordance with a further implementation of the present invention, the interior projection of the outer housing part can be designed such that the height of the projection continually increases toward the inlet-side opening of the housing up to the shoulder of the projection. In other words, the projection is not of angular but rather ramp-like design so as to enable the inner housing part to be easily inserted into the outer housing part. It is thus very easy for even a non-experienced user to replace the inner housing part of the nozzle.

According to a further embodiment, the inner and/or the outer housing part is designed as a turned part. Alternatively hereto, the inner and/or the outer housing part can also be designed as an injection-molded part. Particularly preferential hereby, however, is for the inner housing part to be designed as a turned part and thereafter be overmolded together with the outer housing part, the inner housing part being press-fit into the outer housing part respectively. It would lastly also be conceivable for the entire nozzle to be directly manufactured as a two-component injection molding in one process step.

The inventive nozzle for spraying coating material is particularly applicable as a flat spray nozzle, whereby the second opening of the housing is accordingly configured as a slot. However, it is of course also conceivable for the inventive nozzle to be designed as a deflector cone nozzle, finger nozzle, rotary atomizer or as another type of nozzle.

BRIEF DESCRIPTION OF THE DRAWINGS

The following will draw on the embodiment depicted in the figures in describing the inventive nozzle for spraying coating material in greater detail.

Shown are.

For reasons of clarity, similar components or components have the same effect will be provided with the same reference numerals in the following detailed description of the figures.

DETAILED DESCRIPTION

Figure 1A:
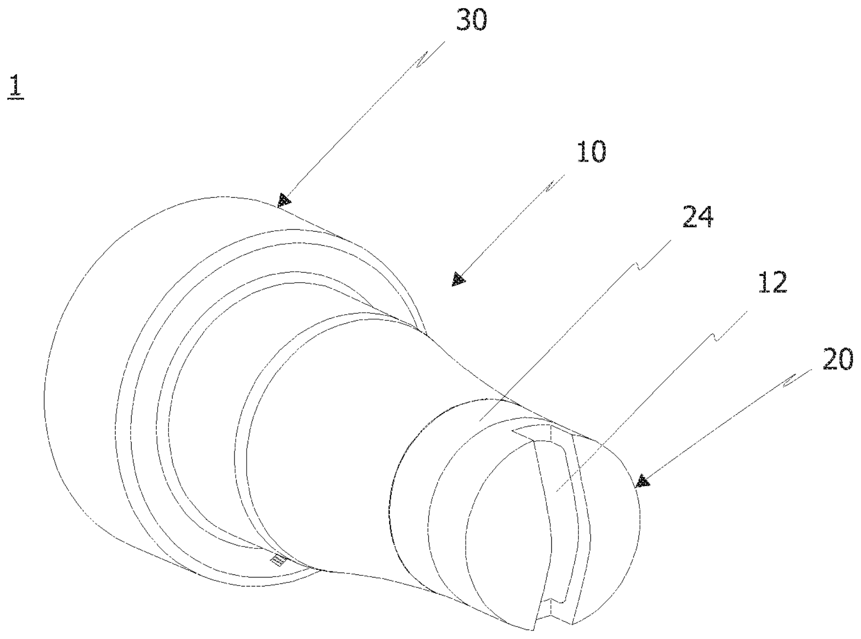
FIG. 1*a*: a perspective frontal view of a first embodiment of the inventive nozzle for spraying coating materials.
Figure 1B:
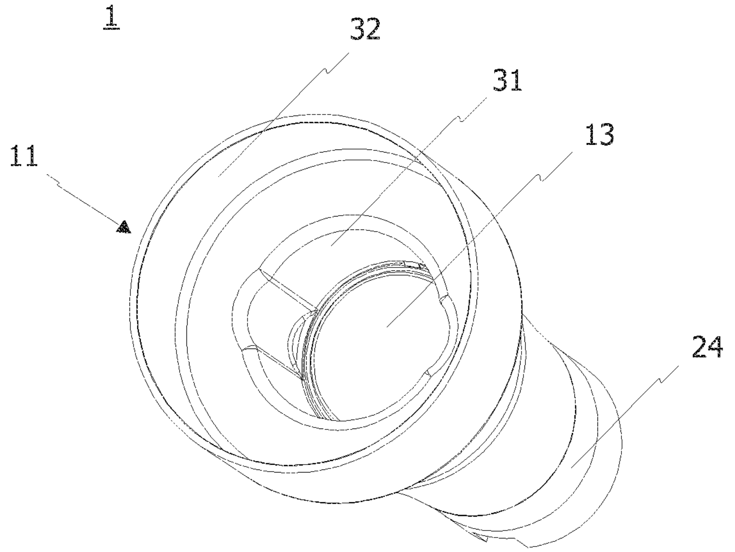
FIG. 1*b*: a perspective rear view of the embodiment of the inventive nozzle shown in FIG. 1.
Figure 2:
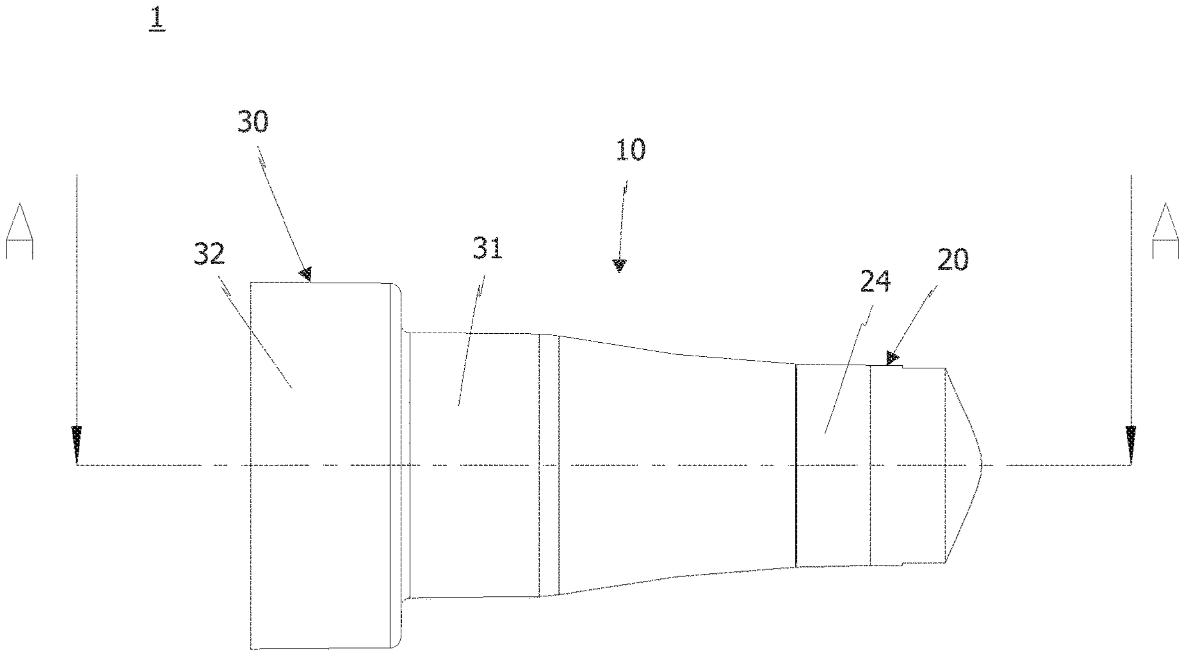
FIG. 2: a side view of the first embodiment of the inventive nozzle shown in FIG. 1*a;*

FIGS. 1*a* and 1*b* are perspective views of a first embodiment of the nozzle 1 for spraying coating material. The nozzle 1 for spraying coating material, particularly coating powder, has a housing comprising a first inlet-side opening 11 and a second outlet-side opening 12. The two openings 11 and 12 are thereby at least partially connected together by means of a through-channel 13 which, in the embodiment depicted, is of particularly cylindrical configuration. The through-channel 13 thereby serves to enable coating material, e.g. coating powder, to be able to flow through the nozzle 1. To this end, the nozzle 1 is detachably connected to a (not shown) coating mechanism so that the through-channel 13 can align with a powder dispending channel of the coating mechanism.

Figure 3A:
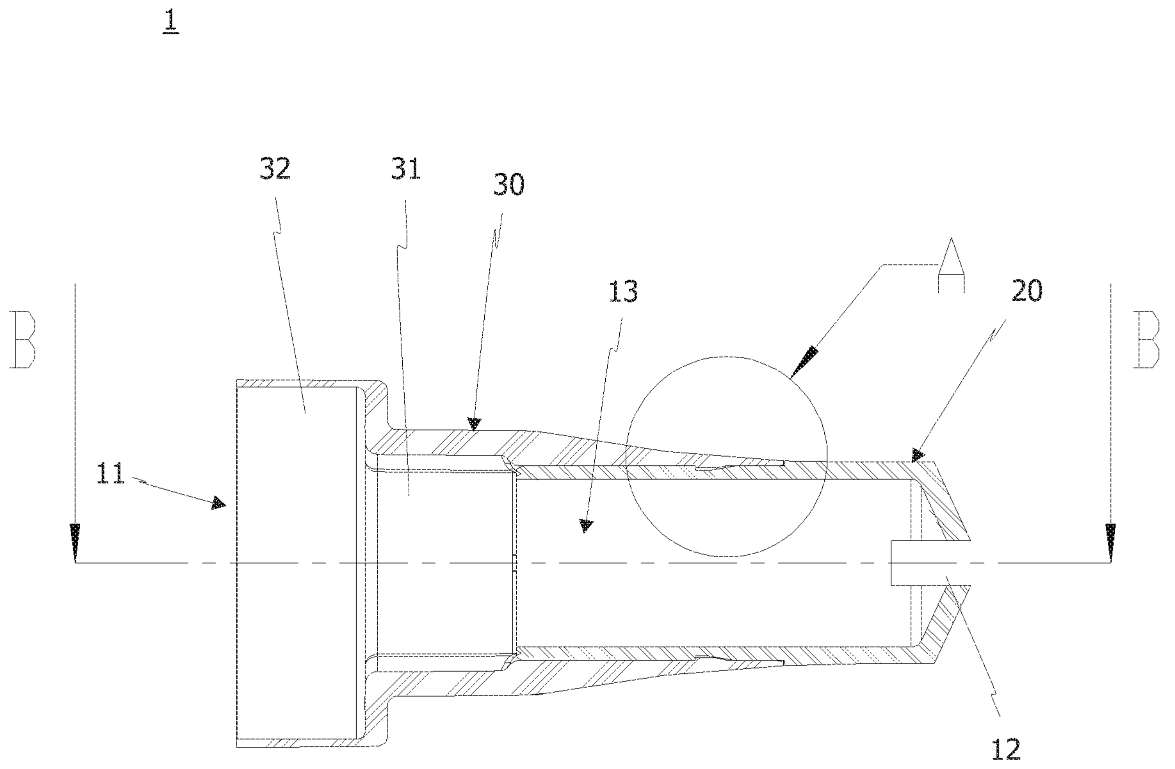
FIG. 3*a*: a cross-sectional view along the intersecting axis A-A of FIG. 2.
Figure 3B:
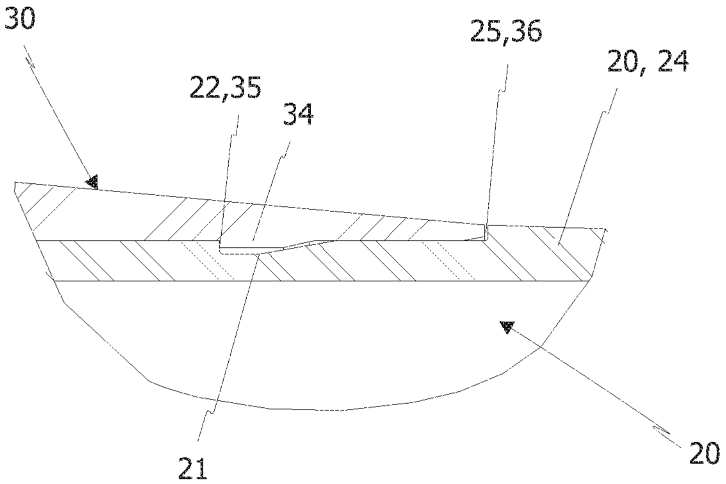
FIG. 3*b*: an enlarged depiction of section A from FIG. 3*a;*

With respect to FIGS. 3*a* and 3*b* as well as 4*a* and 4*b*, it is further noted that the housing comprises an inner housing part 20 as well as an outer housing part 30. In accordance with an embodiment of the invention, the inner housing part 20 is thereby formed separately from the outer housing part 30; i.e. the inner housing part 20 as well as the outer housing part 30 are each formed as separate individual component parts. As can be seen, the outer housing section 30 can form the first, inlet-side opening 11, for example, while the inner housing part 20 defines the second, outlet-side opening 12.

The first inlet-side opening 11, which is formed by the outer housing part 30, serves to receive a (not shown) powder channel of a coating mechanism. Said powder channel is connected to the nozzle 1 particularly by an inlet-side receiving area 31 of the outer housing part 30. A rear connecting area 32 of the outer housing part 30 is in contrast slipped over the (not shown) coating mechanism in order to detachably connect the nozzle 1 to the coating mechanism.

It is also conceivable for the rear connecting area 32 to exhibit an internal screw in order for the nozzle 1 to be screwed onto a coating mechanism. In other words, the receiving area 31 and the connecting area 32 of the outer housing part 30 are provided so that a detachable connection can be established to the coating mechanism.

Figure 4A:
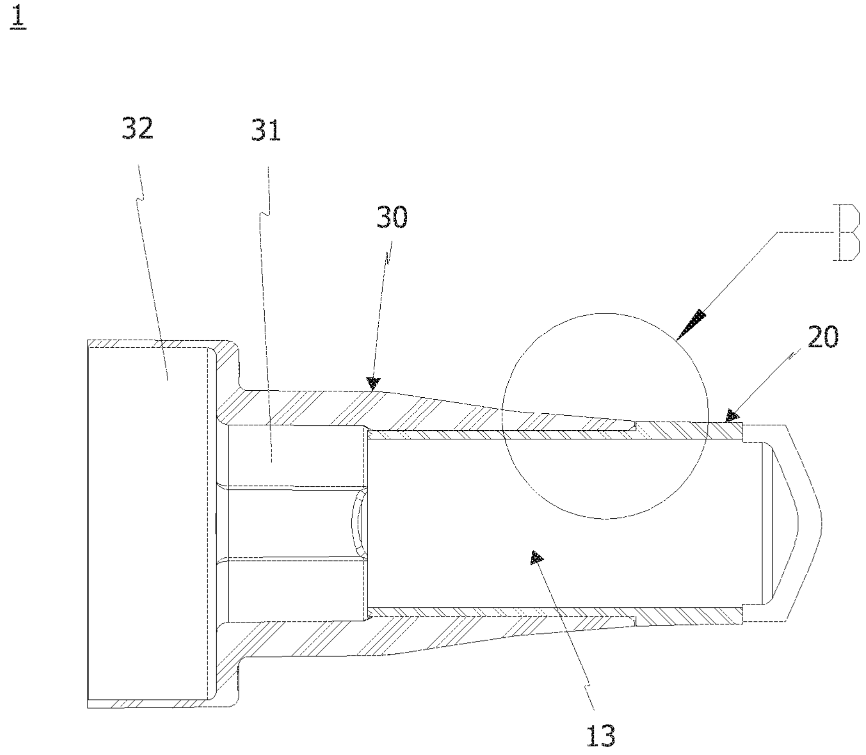
FIG. 4*a*: a cross-sectional view along the intersecting axis B-B of FIG. 3*a*.

The through-channel 13, which comes to align flush with the powder channel of the coating mechanism when the nozzle 1 is installed, is defined solely by the inner housing part 20, as can be further seen from FIGS. 3*a* and 4*a*. The inner housing part 20 exhibits an inner diameter hereto which approximately corresponds to the inner diameter of a coating mechanism powder channel. The interior surface of the inner housing part 20 is preferably made from a material which exhibits particularly favorable frictional properties as well as long service life. For example, the inner housing 20 can be made from polytetrafluoroethylene (PTFE) to that end.

The outer housing part 30, on the other hand, can be made from a different material than the inner housing part 20 in order to save costs. Since, according to the invention, the outer housing part 30 never comes into contact with the coating material, it can be formed from a more economical material than the inner housing part 20. Polypropylene is for example suitable hereto.

Figure 4B:
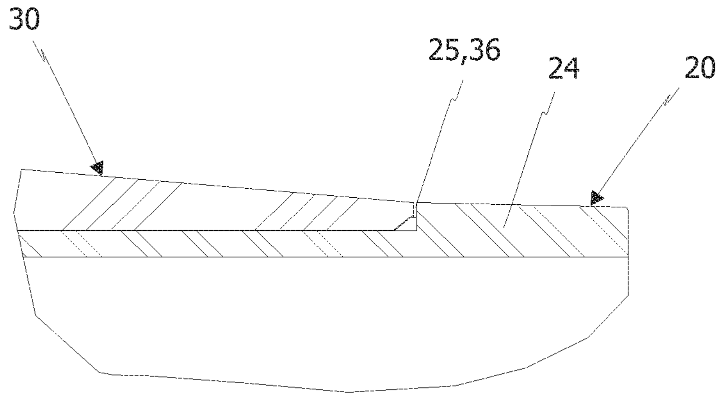
FIG. 4*b*: an enlarged depiction of section B from FIG. 4*a*.

The inner housing part 20 is detachably connected to the outer housing part 30. A click mechanism, which is particularly visible in FIG. 3*b*, is used to that end in the depicted embodiment. In order to form the click mechanism, the outer housing part 30 comprises an interior projection 34 having a shoulder 35 along its interior diameter which is designed to positively engage in an exterior groove 21 of the inner housing part 20. It is recognizable from a comparison of FIGS. 3*b* and 4*b* that the groove 21 according to the embodiment depicted here is only provided at specific regions along the periphery of the inner housing part 20. A similar configuration is also seen with the projection 34 of the outer housing part 30. It is also conceivable for a plurality of projections 34 and grooves 21 to be provided in order to ensure the necessary holding in place of the inner housing part 20 within the outer housing part 30. Because the two housing parts 20 and 30 are of substantially cylindrical configuration, it is accordingly also conceivable for the exterior groove 21 of the inner housing part 20 to be configured as a fully annular groove while projection 34 likewise runs along the entire interior surface of the inner housing part 30.

The projection 34 and the groove 21 are advantageously configured such that the inner housing part 20 can be slid into the interior of the outer housing part 30 after the two housing parts 20, 30 have been produced. It is particularly provided hereto for the interior projection 34 of the outer housing part 30 to be configured such that the height of the projection 34 continues to steadily increase in the direction of the inlet-side opening of the housing until the shoulder 35 reaches the projection 34. In other words, the projection 34 exhibits an inclined bearing surface facing the internal housing part over which the inner housing part 20 can slide when the housing 10 is assembled. As soon as the exterior groove 21 of the inner housing part 20 is slid over the entire projection 34, the groove engages with the shoulder 35 of the projection 34 at its inlet-side shoulder 22.

To prevent the inner housing part 20 from sliding too far into the outer housing part 30, the inner housing part 20 comprises a region 24 of increased diameter. This hereby forms an arrester 25 which contacts a front end region 36 of the outer housing part and thus prevents the first housing part 20 from displacing further in the direction of the inlet-side opening 11.

The present invention is not limited to the embodiment depicted in the drawings. In particular, the nozzle 1 is not limited to the depicted embodiment of the nozzle 1 as a flat spray nozzle but rather can also be provided as any other type of nozzle. Also, instead of the click mechanism, it is of course likewise conceivable for alternative types of connections to be provided between the two housing parts 20 and 30 such as, for example, a screw connection of internal and external threads.

LIST OF REFERENCE SIGNS

1 nozzle
10 housing
11 inlet-side opening
12 outlet-side opening
13 through-channel
20 inner housing part
21 exterior groove
22 shoulder
24 region of increased diameter
25 arrester
30 outer housing part
31 receiving area
32 connecting area
34 interior projection
35 shoulder
36 front region

The invention claimed is:

1. A nozzle for spraying coating material, wherein the nozzle comprises a housing having a first, inlet-side opening and a second, outlet-side opening with the openings being connected together by means of a through-channel, wherein the housing comprises an inner housing part and an outer housing part, wherein neither the inner housing part nor the outer housing part of the nozzle is part of a coating mechanism and wherein the nozzle is detachably connectable to the coating mechanism via the outer nozzle part, wherein the inner housing part and the outer housing part are formed as separate individual component parts, wherein:

the second, outlet-side opening has a reduced diameter in comparison to the first, inlet-side opening and/or the through-channel, for directing a spray of coating material therefrom;

the inner housing part is formed from a different material than the outer housing part, the inner housing part is formed from polytetrafluoroethylene the through-channel is defined solely by the inner housing part, the outer housing part never comes into contact with the coating material when spraying coating material with the nozzle, the outer housing part comprises an interior projection that extends inward from the outer housing part at a position between first and second opposite axial ends of the outer housing part, the inner housing part comprises an exterior groove at a position between first and second opposite axial ends of the inner housing part, and the interior projection of the outer housing part has a first shoulder facing the inlet-side opening of the housing, which is formed to positively engage a second shoulder in the exterior groove of the inner housing part that faces the outlet-side opening of the housing.

2. The nozzle according to claim 1, wherein the outer housing part is formed from polypropylene.

3. The nozzle according to claim 1, wherein the inner housing part is detachably connected to the outer housing part.

4. The nozzle according to claim 1, wherein the interior projection of the outer housing part is designed such that the height of the projection continually increases toward the inlet-side opening of the housing until reaching the shoulder of the projection.

5. The nozzle according to claim 1, wherein the inner and/or the outer housing part is a turned part.

6. The nozzle according to claim 1, wherein the inner and/or the outer housing part is an injection-molded part.

7. The nozzle according to claim 1, wherein the second opening of the housing is configured as a slot.

8. The nozzle according to claim 1, wherein the inner housing part comprises a region of increased diameter that forms an arrester at a first axial end of the region of increased diameter facing the inlet-side opening of the housing, and the outer housing part is configured such that the second axial end thereof contacts the arrester to prevent further displacement of the inner housing part toward the inlet-side opening of the housing.

* * * * *